United States Patent
Boncato et al.

(10) Patent No.: US 9,960,665 B2
(45) Date of Patent: May 1, 2018

(54) POWER SUPPLIES HAVING A SINGLE ISOLATION DEVICE FOR FEEDBACK AND FAULT DETECTION

(71) Applicant: Astec International Limited, Kowloon (HK)

(72) Inventors: Yancy Fontanilla Boncato, Quezon (PH); Jonathan Ross Bernardo Fauni, Quezon (PH); Jessica Cabiles Magsino, Pasig (PH); Ronnie Bachiller Gozun, Quezon (PH)

(73) Assignee: ASTEC INTERNATIONAL LIMITED, Kwun Tong, Kowloon (HK)

( * ) Notice: Subject to any disclaimer, the term of this patent is extended or adjusted under 35 U.S.C. 154(b) by 0 days. days.

(21) Appl. No.: 14/957,103

(22) Filed: Dec. 2, 2015

(65) Prior Publication Data

US 2017/0163144 A1 Jun. 8, 2017

(51) Int. Cl.
  *H02M 1/32* (2007.01)
  *H02M 1/42* (2007.01)
  *H02M 3/335* (2006.01)
  *H02H 7/125* (2006.01)

(52) U.S. Cl.
  CPC ............ *H02M 1/32* (2013.01); *H02H 7/1252* (2013.01); *H02M 1/4225* (2013.01); *H02M 3/33523* (2013.01)

(58) Field of Classification Search
  CPC ......... H02M 3/33507; H02M 3/33523; H02M 3/33561; H02M 3/33569; H02M 3/33592; H02M 1/32; H02M 1/36; H02M 2001/0006; H02H 7/1227; H02H 7/53871

USPC .......... 363/21.01–21.18, 37, 56.03; 323/902
See application file for complete search history.

(56) References Cited

U.S. PATENT DOCUMENTS

| 6,088,244 A | 7/2000 | Shioya et al. |
| 7,245,510 B2 * | 7/2007 | Baurle ............. H02M 3/33507 363/21.12 |
| 7,324,354 B2 * | 1/2008 | Joshi ................... H02M 3/1588 363/17 |
| 8,520,415 B1 | 8/2013 | Krishnamoorthy et al. |

(Continued)

OTHER PUBLICATIONS

Multi-mode controller for SMPS; L6566B; Dec. 2008; 51 pages.

*Primary Examiner* — Yemane Mehari
(74) *Attorney, Agent, or Firm* — Harness, Dickey & Pierce, P.L.C.

(57) ABSTRACT

According to some aspects of the present disclosure, isolated power supplies and corresponding control methods are disclosed. Example isolated power supplies include a transformer, at least one power switch coupled to the transformer, a controller, an output terminal, and a feedback circuit coupled to the output terminal to sense the output voltage and compare the sensed output voltage to a voltage reference. The power supplies include a fault detection circuit to sense the output voltage, compare the sensed output voltage to a fault reference, and modify a feedback signal when the sensed output voltage exceeds the fault reference. The power supplies also include a single isolation device coupled between the feedback circuit and the controller. The controller is operable to control the power switch based on the feedback signal and to detect a fault condition when a slew rate of the feedback signal exceeds a fault threshold slew rate value.

20 Claims, 9 Drawing Sheets

(56) References Cited

U.S. PATENT DOCUMENTS

| | | | | |
|---|---|---|---|---|
| 8,804,378 B2* | 8/2014 | Soleno | ............. | H02M 3/33523 |
| | | | | 323/902 |
| 8,934,267 B2* | 1/2015 | He | .................. | H02M 3/3378 |
| | | | | 363/17 |
| 8,975,825 B2* | 3/2015 | Hu | ................... | H05B 33/0854 |
| | | | | 315/239 |
| 2002/0131280 A1* | 9/2002 | Balakrishnan | .......... | H02H 3/06 |
| | | | | 363/21.15 |
| 2015/0326008 A1* | 11/2015 | Baurle | ................... | H02H 7/10 |
| | | | | 361/87 |

* cited by examiner

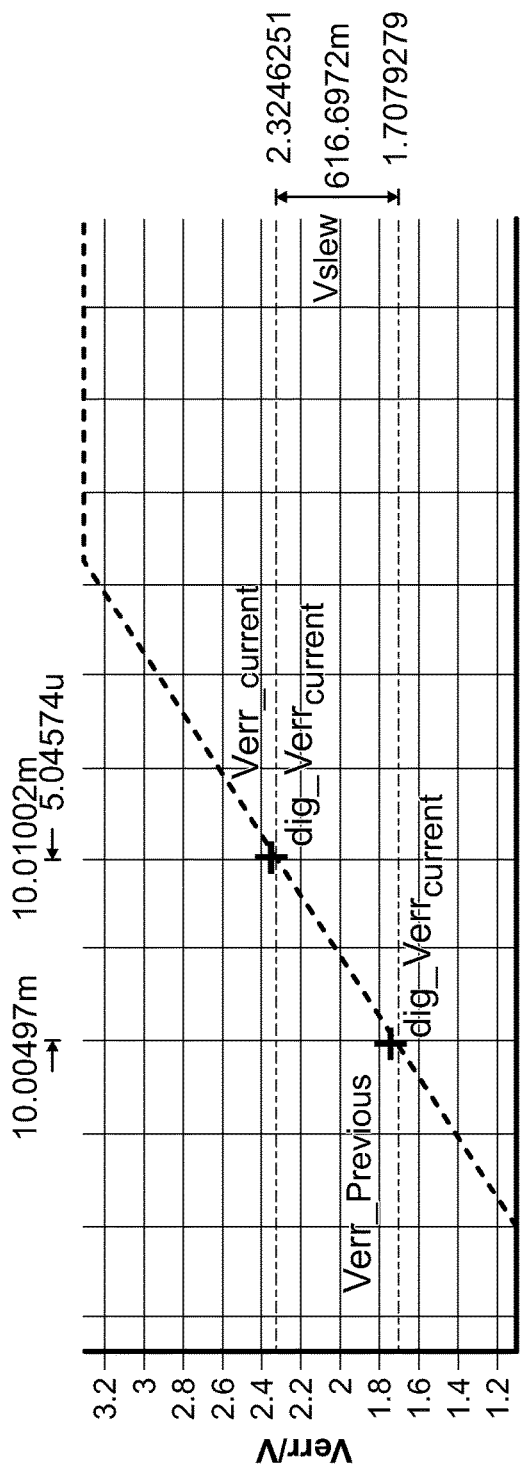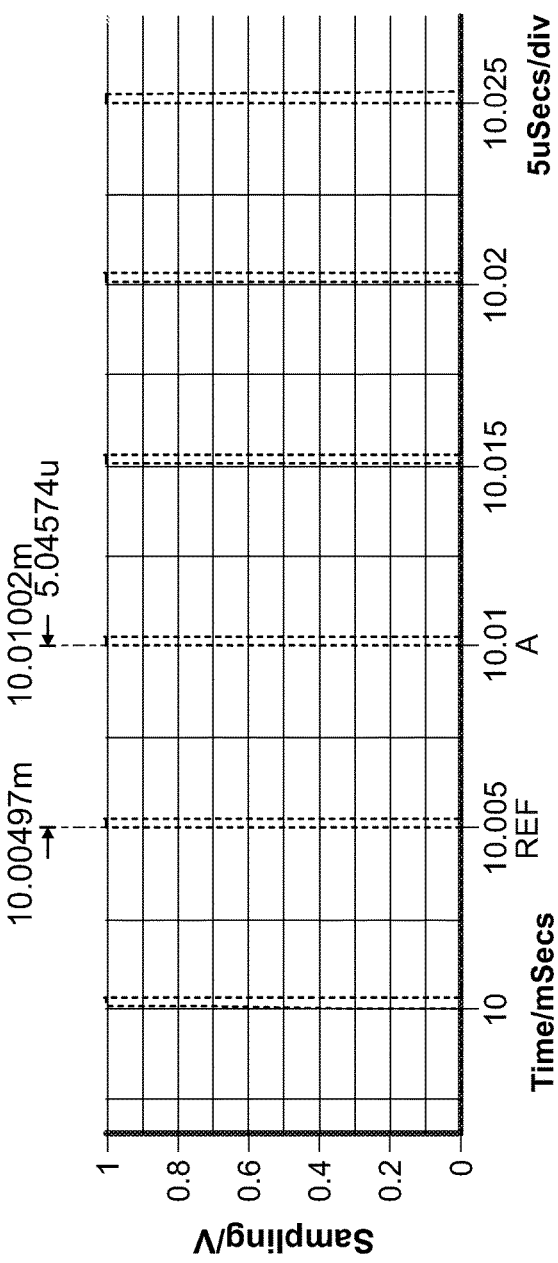
FIG. 6A
FIG. 6B

POWER SUPPLIES HAVING A SINGLE ISOLATION DEVICE FOR FEEDBACK AND FAULT DETECTION

FIELD

The present disclosure relates to isolated power supplies having a single isolation device for feedback and fault detection, and corresponding control methods.

BACKGROUND

This section provides background information related to the present disclosure which is not necessarily prior art.

AC-DC power supplies often include two stages of converters: a power factor correction (PFC) stage front end to achieve a desired power factor; and a DC-DC converter stage to achieve isolation and step down functionality. The conventional approach to controlling these two converters requires two digital signal processors (DSPs), with one DSP controlling each stage. Additionally, two isolation devices are typically used. One isolation device is used for feedback control from a secondary side of the DC-DC converter to the primary side, while a second isolation device is used for fault detection and protection.

SUMMARY

This section provides a general summary of the disclosure, and is not a comprehensive disclosure of its full scope or all of its features.

According to one aspect of the present disclosure, an isolated power supply includes a transformer having a primary winding and a secondary winding, at least one power switch coupled to the primary winding of the transformer, a controller coupled to the power switch to control operation of the power switch, an output terminal coupled to the secondary winding to provide an output voltage to a load, and a feedback circuit coupled to the output terminal to sense the output voltage and compare the sensed output voltage to a voltage reference to define a feedback signal. The power supply also includes a fault detection circuit coupled between the output terminal and the feedback circuit to sense the output voltage, compare the sensed output voltage to a fault reference, and modify the feedback signal when the sensed output voltage exceeds the fault reference. The power supply further includes a single isolation device coupled between the feedback circuit and the controller to provide the feedback signal to the controller. The controller is operable to control the power switch based on the feedback signal and to detect a fault condition when a slew rate of the feedback signal exceeds a fault threshold slew rate value.

According to another aspect of the present disclosure, a method of detecting fault conditions in an isolated power supply is disclosed. The power supply includes a controller, a transformer having a primary winding and a secondary winding, at least one power switch coupled to the primary winding of the transformer, an output terminal coupled to the secondary winding, a feedback circuit coupled to the output terminal, a fault detection circuit coupled between the output terminal and the feedback circuit, and a single isolation device coupled between the feedback circuit and the controller. The method includes transmitting a feedback signal to the controller via the single isolation device. The feedback signal is defined by comparing a sensed output voltage at the output terminal to a voltage reference. The method also includes controlling switching operation of the power switch based on the feedback signal received at the controller, modifying the feedback signal transmitted to the controller via the single isolation device when the sensed output voltage exceeds a fault reference, and detecting a fault condition when a slew rate of the feedback signal exceeds a fault threshold slew rate value.

According to another aspect of the present disclosure, a method of initiating a soft start of an isolated power supply is disclosed. The power supply includes a controller, a transformer having a primary winding and a secondary winding, at least one power switch coupled to the primary winding of the transformer, an input terminal, an output terminal coupled to the secondary winding, a feedback circuit coupled to the output terminal, and at least one isolation device coupled between the feedback circuit and the controller to provide a feedback signal to the controller. The method includes initializing an accumulator value when an input voltage is detected at the input terminal of the power supply, and periodically comparing the accumulator variable to an error value of the feedback signal. When the accumulator variable is less than the error value of the feedback signal, the method includes controlling operation of the power switch based on the accumulator variable and incrementing the accumulator variable each operating cycle. When the error value of the feedback signal is less than the accumulator variable, the method includes controlling operation of the power switch based on the error value of the feedback signal.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 6A and 6B are line graphs of example feedback signal sampling during an increase in the feedback signal.

DETAILED DESCRIPTION

Figure 1:
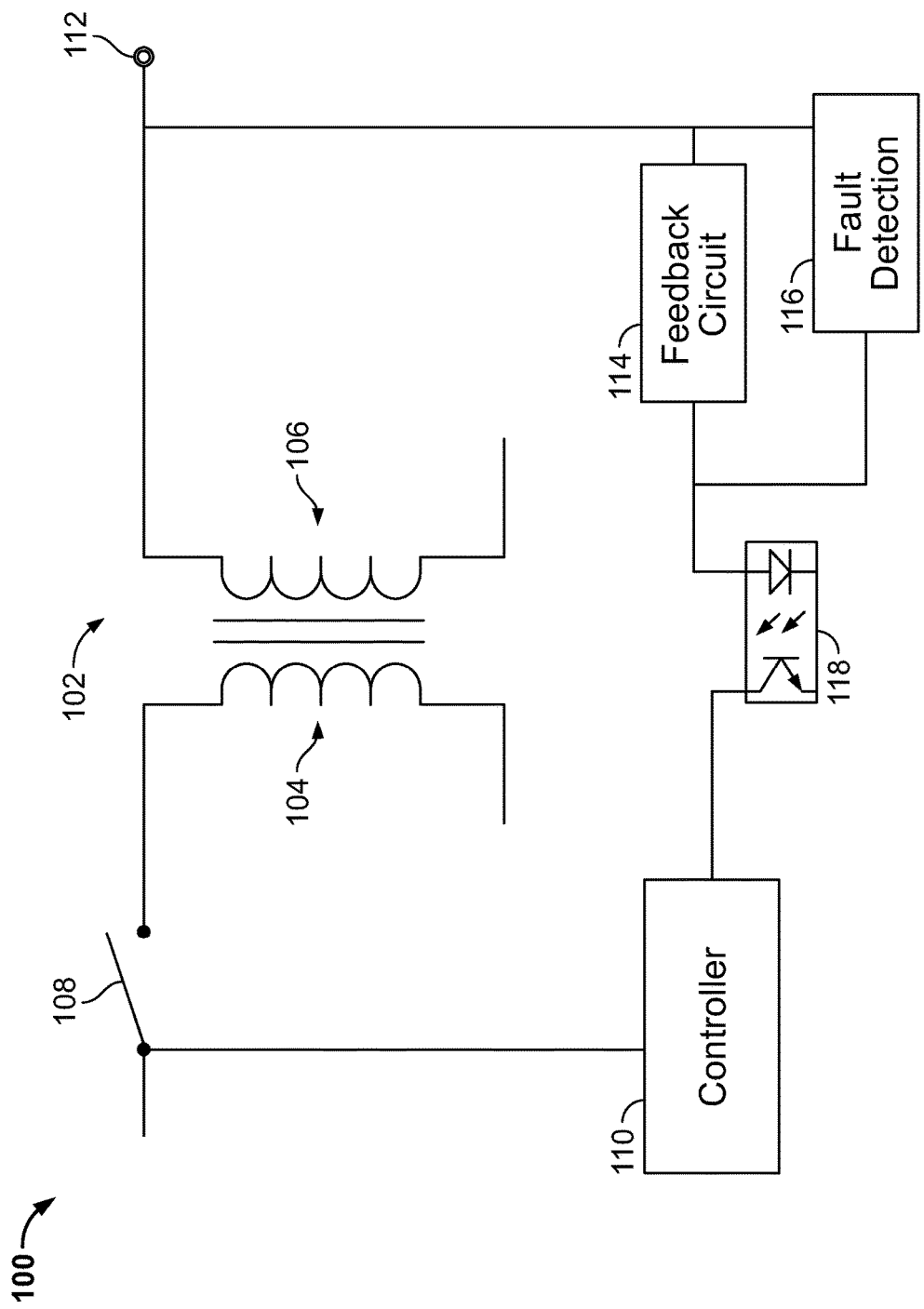
FIG. 1 is a block diagram of an example isolated power supply according to one embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

An isolated power supply according to one example embodiment of the present disclosure is illustrated in FIG. 1 and indicated generally by reference number 100. As shown in FIG. 1, the power supply includes a transformer 102 having a primary winding 104 and a secondary winding 106. A power switch 108 is coupled to the primary winding 104 of the transformer 102, and a controller 110 is coupled to the power switch to control operation of the power switch. An output terminal 112 is coupled to the secondary winding 106 to provide an output voltage to a load (not shown).

As shown in FIG. 1, the isolated power supply 100 includes a feedback circuit 114 coupled to the output terminal 112. The feedback circuit 114 senses the output voltage at the output terminal 112 and compares the sensed output voltage with a voltage reference to define a feedback signal.

The isolated power supply 100 also includes a fault detection circuit 116 coupled between the output terminal 112 and the feedback circuit 114. The fault detection circuit 116 senses the output voltage at the output terminal 112 and compares the sensed output voltage to a fault reference. The fault detection circuit 116 modifies the feedback signal when the sensed output voltage exceeds the fault reference.

As shown in FIG. 1, the isolated power supply 100 includes a single isolation device 118 coupled between the feedback circuit 114 and the controller 110. The isolation device 118 provides the feedback signal to the controller 110. The controller 110 is operable to control the power switch based on the feedback signal, and to detect a fault condition when a slew rate of the feedback signal exceeds a fault threshold slew rate value.

Accordingly, the single isolation device 118 may provide both feedback control and fault protection for the power supply 100. Using the slew rate of the feedback signal to indicate fault conditions can allow for power supply turn off, reset, fault protection, latch protection, etc. using the single isolation device 118. This can reduce the need for additional fault detection isolation components, which reduces part counts, circuit complexity, cost, etc.

Faults may be identified by the steepness (e.g., rate of change, slope, etc.) of the slew rate of the feedback signal from the isolation device 118. For example, the feedback signal has slower transitions during normal running conditions and transient load conditions, as compared to fault conditions. During a fault condition, the slew rate value of the feedback signal is greater than during normal and transient operating conditions, and the controller can detect the fault condition when the slew rate value exceeds a fault threshold. Accordingly, the feedback signal from the isolation device 118 can serve as a feedback control signal during normal and transient operating conditions, while also identifying a fault condition based on an increased slew rate value of the feedback signal when faults occur.

The controller 110 may be any suitable controller, including a microprocessor, microcontroller, integrated circuit, digital signal processor, etc. The controller 110 may be operable to perform any of the example processes described herein using any suitable hardware and/or software implementation. For example, the controller 110 may execute computer-executable instructions, may include one or more logic gates, control circuitry, etc.

Figure 2:
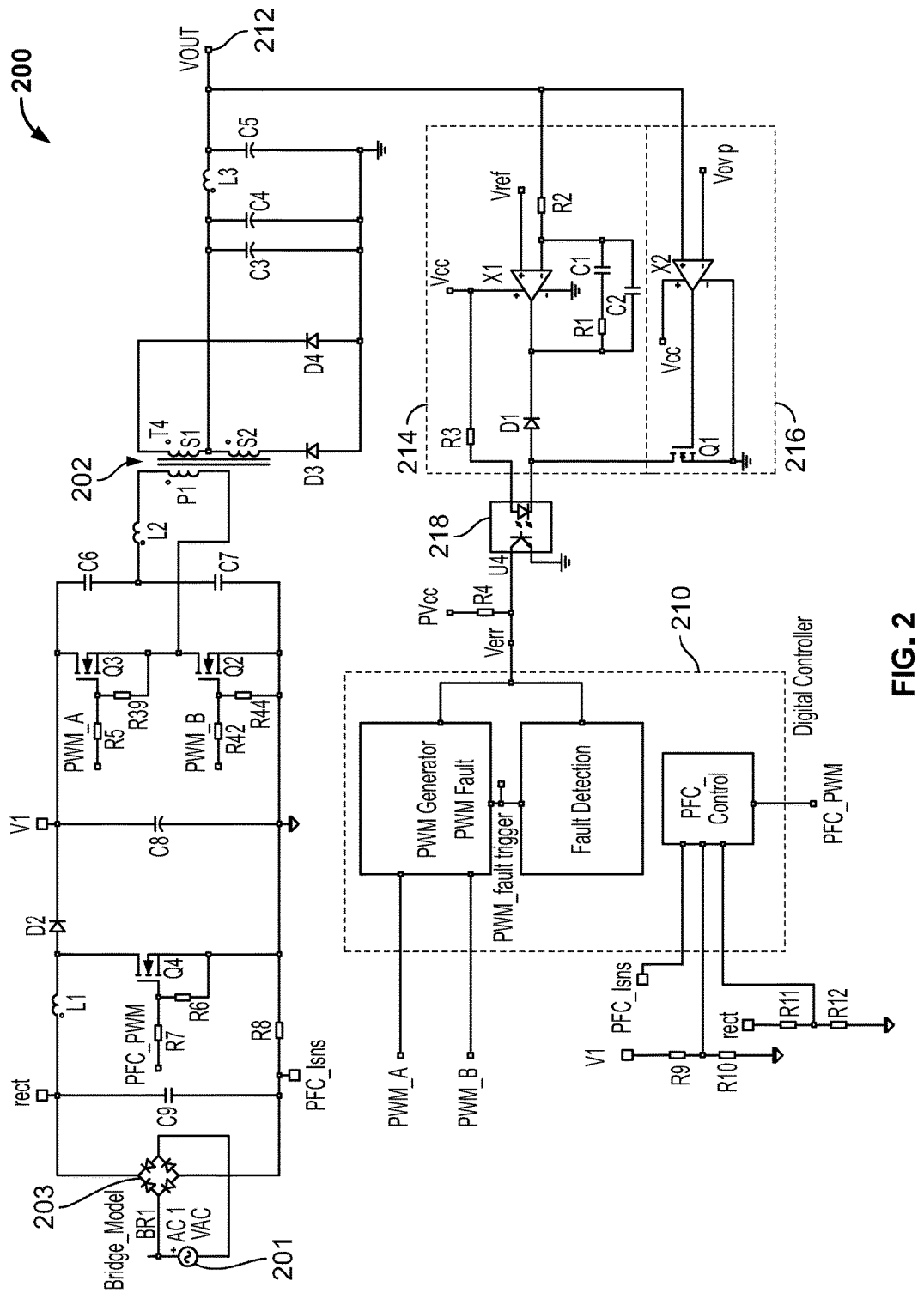
FIG. 2 is an example circuit diagram of the isolated power supply of FIG. 1.

FIG. 2 illustrates an example circuit diagram of a power supply 200, which may be similar to the power supply 100 of FIG. 1. The power supply 200 includes a front end PFC circuit and a DC-DC converter. The front end PFC circuit receives an alternating current (AC) input voltage from a voltage source 201 (e.g., via an input terminal, etc.). The input voltage is rectified at bridge 203 to provide rectified voltage (rect). The rectified voltage (rect) is then converted by the PFC converter stage for power factor correction, using PFC control switch Q4. The PFC converter stage provides a PFC voltage output V1 to the DC-DC converter stage.

The DC-DC converter stage receives the voltage output V1 from the PFC converter stage. The DC-DC converter stage includes power switches Q2 and Q3, and transformer 202. The power switches Q2 and Q3 are coupled to the primary side of transformer 202. The secondary side of transformer 202 provides an output voltage VOUT at an output terminal 212 of the power supply 200.

Feedback circuit 214 includes comparator X1 and voltage reference Vref. The comparator X1 compares a sensed output voltage VOUT with the voltage reference Vref, to define a feedback control signal. For example, the voltage reference Vref may correspond to a desired output voltage VOUT. The feedback control signal is provided to controller 210 via isolation device 218. The feedback control signal is used by the controller 210 to control power switches Q2 and Q3, thereby maintaining a desired output voltage VOUT.

Fault detection circuit 216 includes comparator X2 and fault reference Vov_p. The comparator X1 compares the sensed output voltage VOUT to the fault reference Vov_p. For example, the fault reference may be an overvoltage reference indicative of an unsafe overvoltage condition. The fault detection circuit may therefore trigger a fault condition when the sensed output voltage exceeds the fault reference.

As shown in FIG. 2, the fault detection circuit 216 includes a fault switch Q1. The fault switch Q1 is triggered (e.g., turned on by the comparator X2) when the fault detection circuit 216 detects a fault condition (e.g., when the sensed output voltage VOUT exceeds the fault reference Vov_p as determined by comparator X2, etc.). The fault switch Q1 is coupled to the feedback circuit 214 and the isolation device 218. The fault switch Q1 modifies the feedback signal when activated, by adjusting the slew rate of the feedback signal. For example, the fault switch Q1 may increase the slew rate of the feedback signal beyond a fault threshold slew rate by saturating the isolation device 218 (e.g., to a high saturation condition, a low saturation condition, etc.) when the fault switch Q1 is activated.

The isolation device 218 provides the feedback signal Verr to the controller 210. The controller 210 uses the feedback signal Verr for both control of the power switches Q2 and Q3 to maintain a desired output voltage VOUT, and to detect fault conditions when the slew rate value of the feedback signal Verr exceeds a fault threshold.

As shown in FIG. 2, a single controller 210 is used for control of both the PFC converter stage and the DC-DC converter stage, but other embodiments may include multiple controllers. The PFC_CONTROL portion of the controller 210 senses the rectified input voltage (rect) and the bulk voltage V1 to shape and regulate the voltage V1 provided to the DC-DC converter stage, by adjusting switching of the PFC control switch Q4. For example, the controller 210 may adjust the duty cycle of switch Q4, adjust the frequency of switch Q4, etc. based on the sensed voltages (rect) and V1.

The controller 210 is on the primary side of the power supply 200. To control the power switches Q2 and Q3 to regulate the output voltage VOUT, the controller 210 requires a feedback signal from the secondary side of the power supply. The feedback signal Verr is provided from the isolation device 218 to the controller 210. For example, the controller 210 may include an analog to digital converter (ADC) pin to sample the feedback signal Verr. In some example embodiments, the feedback signal Verr may be proportional to a duty cycle for pulse width modulation (PWM) converters, and may be proportional to a switch period for resonant converters.

The controller 210 controls the power switches Q2 and Q3 based on the feedback signal Verr, to regulate the output voltage VOUT. For example, the controller 210 may adjust the duty cycle of power switches Q2 and Q3 (e.g., via a PWM control signal), the switching frequency of power switches Q2 and Q3, etc. based on the feedback signal Verr.

The controller 210 can also monitor for fault detection based on the slew rate of the feedback signal Verr. When the slew rate value of the feedback signal exceeds a fault threshold, the controller 210 may stop operation of the power supply 200 (e.g., by stopping operation of power switches Q2 and Q3, by opening power switches Q2 and Q3, etc.).

Figure 3:
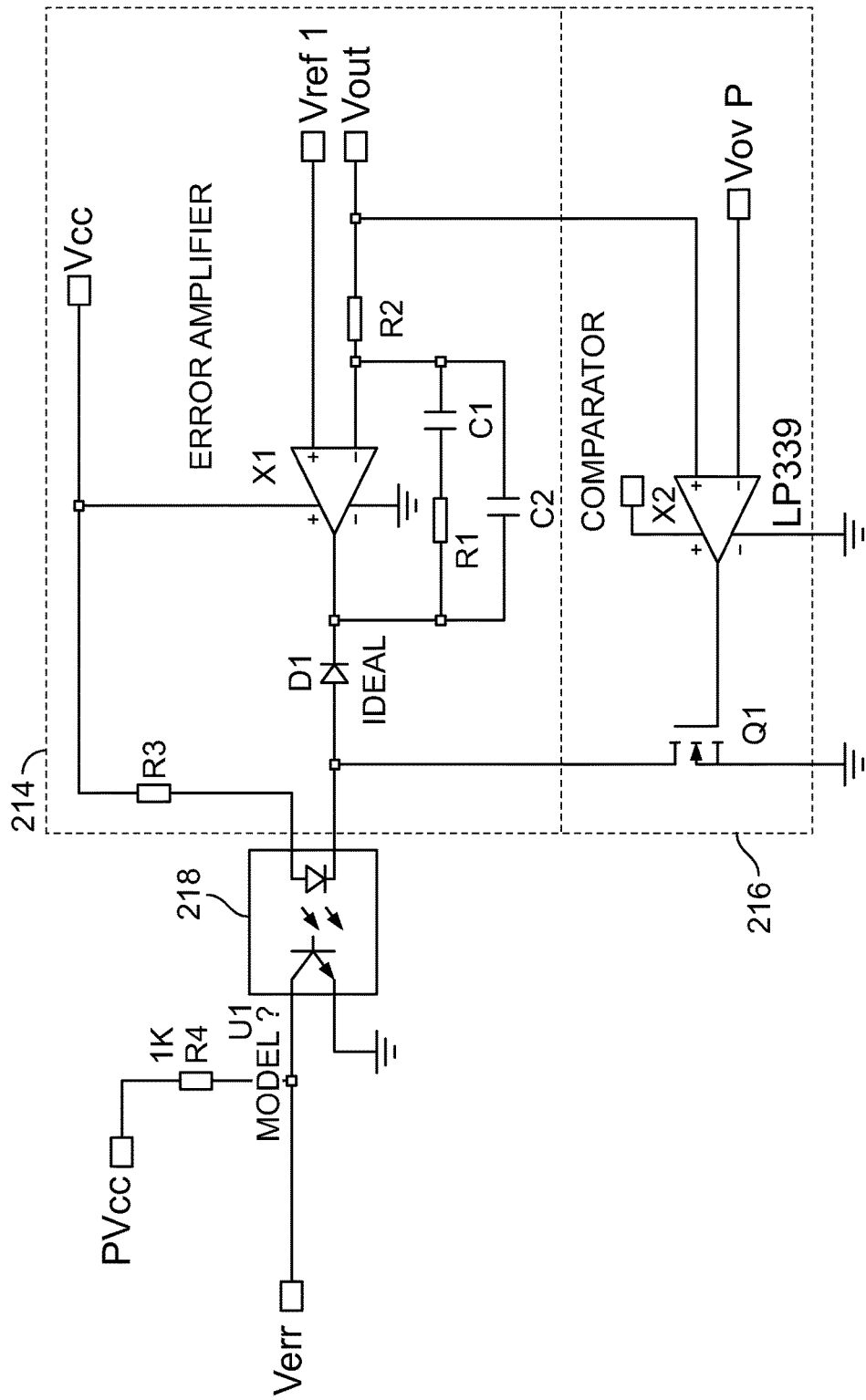
FIG. 3 is the circuit diagram of the feedback circuit, fault detection circuit and isolation device of the isolated power supply of FIG. 2.

FIG. 3 illustrates a close up view of the feedback control circuit 214 and the fault detection circuit 216 of the power supply 200 illustrated in FIG. 2. As described above, comparator X1 of the feedback control circuit 214 compares a sensed output voltage Vout to a voltage reference Vref1, to define a feedback signal. The feedback signal is provided to a controller (not shown in FIG. 3) via the isolation device 218 as Verr. As shown in FIG. 3, the isolation device is an optocoupler, but other suitable isolation device(s) may be used in other example embodiments.

As described above, the fault detection circuit 216 includes a comparator X2 that compares the sensed output voltage Vout to a fault reference Vov_p. When the sensed output voltage Vout exceeds the fault reference Vov_p, the comparator activates fault switch Q1. Because the fault switch Q1 is coupled to the isolation device 218, activation of the fault switch Q1 saturates the diode of the optocoupler (e.g., to a high saturation condition, to a low saturation condition, etc.). Once the optocoupler is saturated, the feedback signal Verr goes low. Accordingly, the fault detection circuit 216 can modify the feedback signal Verr when a fault condition is detected (e.g., when the output voltage Vout exceeds an overvoltage protection reference, etc.).

The example circuit diagrams and components shown in FIGS. 2 and 3 are included for purposes of illustration only, and it should be apparent that other suitable circuits and components may be used without departing from the scope of the present disclosure. For example, other power supplies may include different PFC circuitry, different DC-DC converter circuitry, etc. Other power supplies may include different feedback circuitry, different fault detection circuitry, etc. coupled to the single isolation device.

Figure 4A:
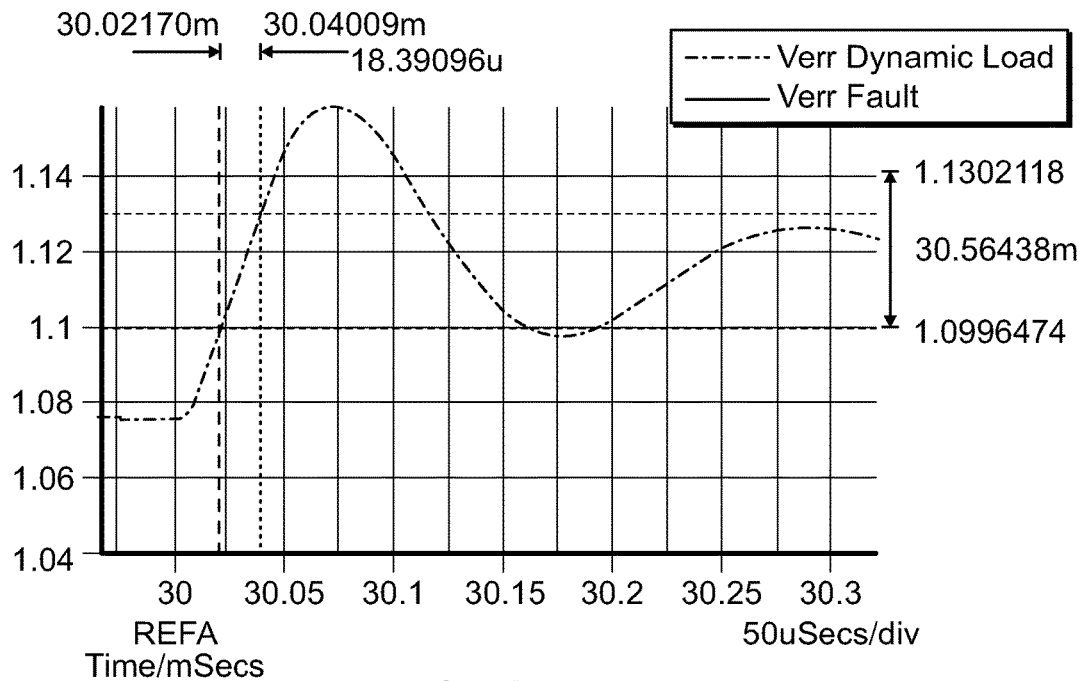
FIGS. 4A and 4B are line graphs of example feedback signals of the isolated power supply of FIG. 1.
Figure 4B:
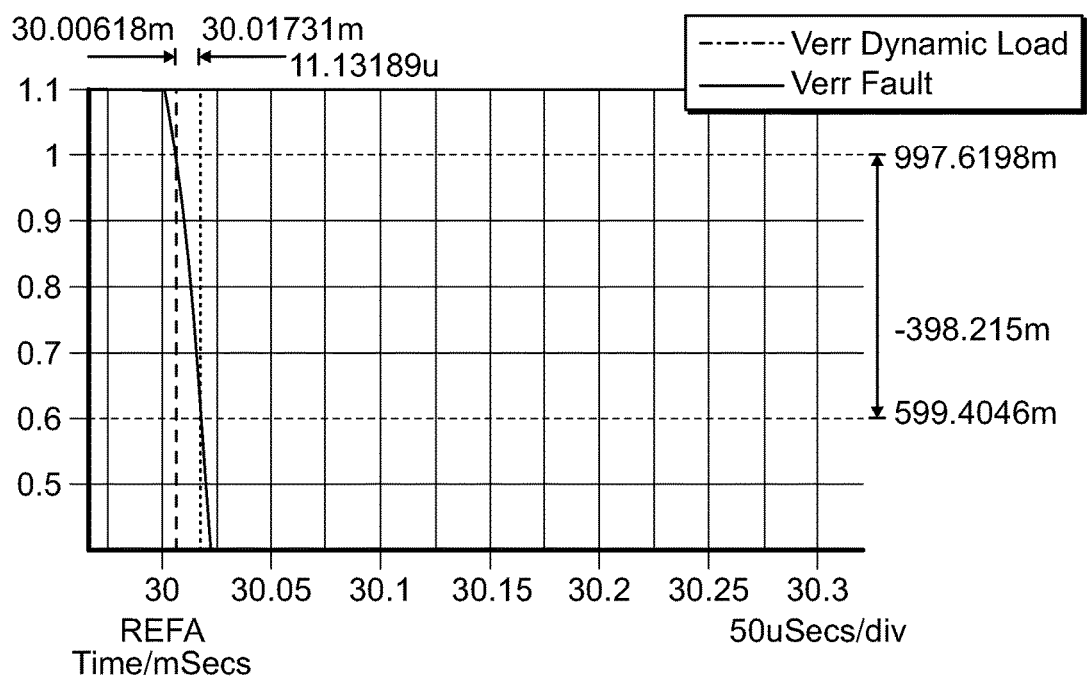

FIGS. 4A and 4B illustrate a comparison of the feedback signal rate of change during a transient load condition (FIG. 4A) and a fault condition (FIG. 4B). For example, FIG. 4A illustrates an increase in the feedback signal of 30.6 mV during a time period of 18.4 microseconds. This results in a rate of change of the feedback signal of approximately 1.66 mV/microsecond during a transient load condition.

FIG. 4B illustrates the rate of change of the feedback signal during a fault condition. In this example, the feedback signal voltage drops 398.2 mV in 11.1 microseconds, for a rate of change of approximately 35.7 mV/microsecond. Accordingly, the slew rate of the feedback signal is much greater (e.g., steeper, having a greater slope, etc.) during a fault condition than the slew rate during a transient load condition.

Therefore, a controller can determine when a fault condition has occurred by monitoring the slew rate of the feedback signal. When the slew rate exceeds a fault threshold, the high slew rate is indicative of a fault condition. The slew rate fault threshold can be selected such that the fault threshold is above a slew rate value that would occur during normal and transient load conditions, but below a slew rate that occurs during a fault condition (e.g., when the optocoupler is saturated, etc.).

In some example embodiments, the feedback signal Verr can be sampled at a specified sampling frequency, producing a sampling value dig_Verr at each sample time. To detect the slew rate of the feedback signal, a difference between consecutive samples can be computed. This may remove the time component of the slew rate calculation, due to the periodic sampling. For example, the slew rate may be calculated as Vslew=dig_Verr_previous−dig_Verr_current. For positive values of Vslew, if the value of Vslew is large, it indicates that there is a fast, positive rate of change in the Verr signal. If the positive Vslew value is above a positive fault threshold, a fault condition may be indicated. For negative values of Vslew, if the value of Vslew is a large negative value, it indicates that there is a fast, negative rate of change in the Verr signal. If the negative Vslew value is below a negative fault threshold, a fault condition may be indicated. In some embodiments, the absolute value of Vslew can be used to determine a fault condition. If the absolute value of Vslew is large, it indicates that there is a fast rate of change in the Verr signal. If the absolute value of Vslew is beyond a fault threshold, a fault condition may be indicated.

Figure 5A:
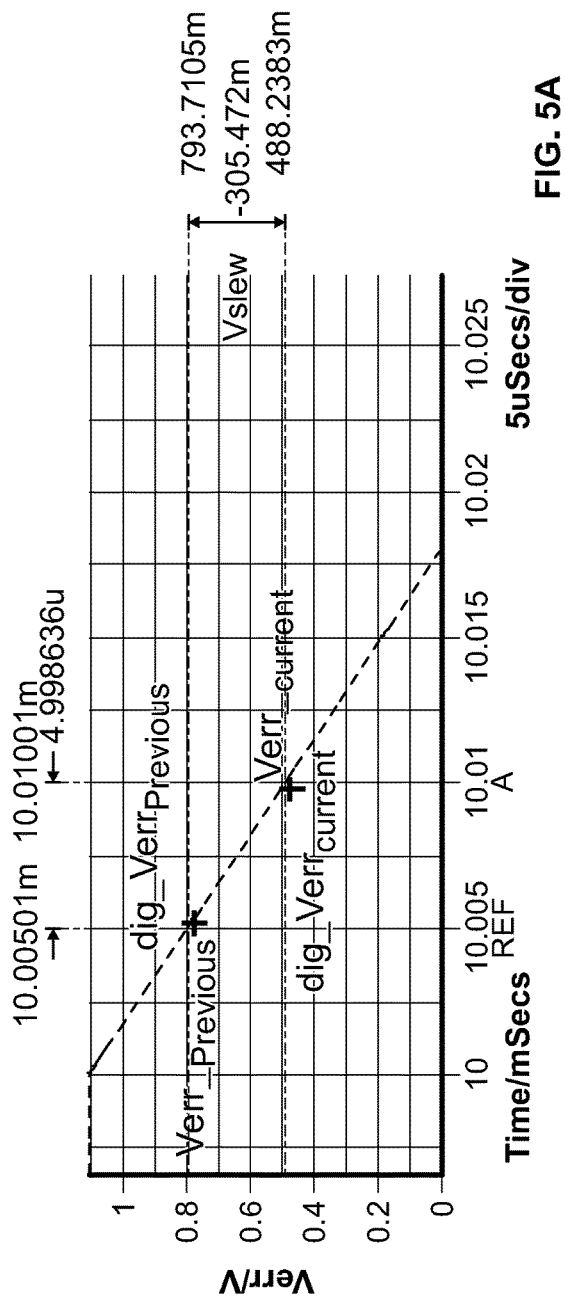
FIGS. 5A and 5B are line graphs of example feedback signal sampling in the isolated power supply of FIG. 1.
Figure 5B:
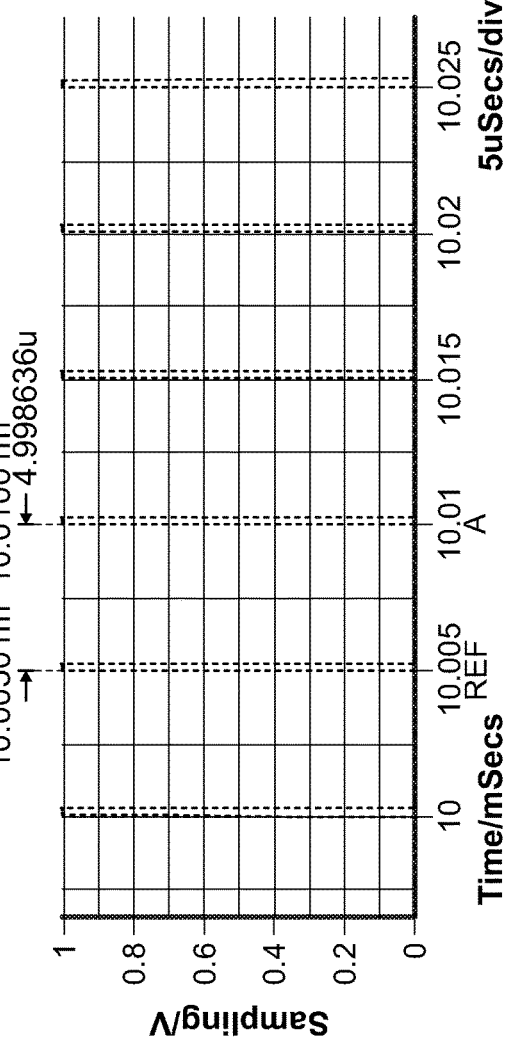

FIGS. 5A and 5B illustrate an example sampling of the feedback signal Verr according to this method. As shown in FIG. 5B, the feedback signal Verr is sampled at 5 microsecond intervals. As shown in FIG. 5A, a current sample dig_Verr_current is compared to a previous sample dig_Verr_previous to determine the slew rate. If the value of Vslew is below a negative fault threshold, a fault condition is detected. Similarly, if the absolute value of Vslew is used and the absolute value of Vslew is above a fault threshold, a fault condition is detected. The fault threshold may be selected such that the Vslew rate calculated according to the sampling method will not exceed the fault threshold during normal and transient load operating conditions, but the Vslew value will exceed the fault threshold when a fault condition occurs (e.g., when the optocoupler is saturated, etc.).

FIGS. 6A and 6B illustrate a similar example as FIGS. 5A and 5B, but in FIGS. 6A and 6B the slew rate value Vslew is increasing. Accordingly, in some example embodiments the value of Vslew can be monitored to detect a fault condition whenever Vslew increases at a rate exceeding a positive fault threshold, whenever Vslew has a negative value that exceeds a negative fault threshold, whenever the absolute value of Vslew exceeds an absolute value fault threshold, etc.

Figure 7:
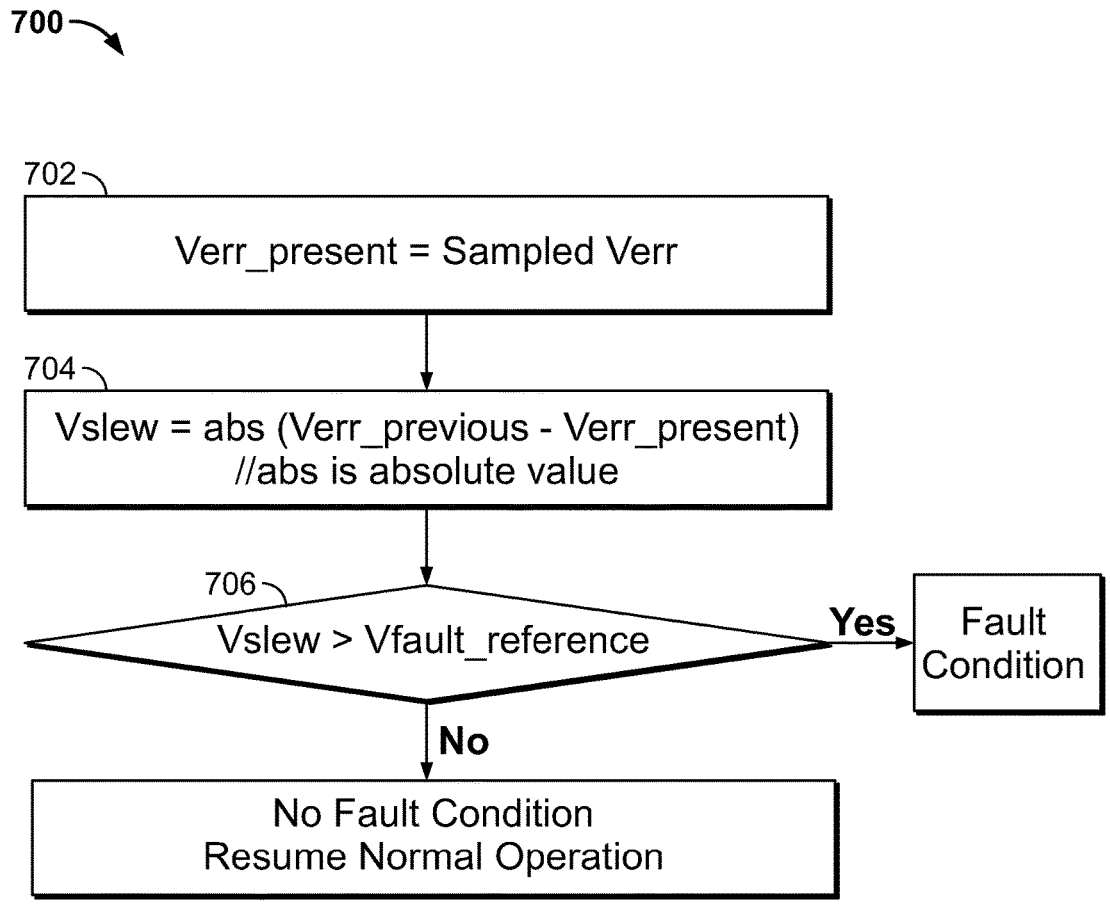
FIG. 7 is a flow chart of an example method of detecting a fault condition in the isolated power supply of FIG. 1.

FIG. 7 illustrates an example algorithm 700 for detecting fault conditions as described above. At 702, the feedback signal Verr is sampled to get a present value of Verr. At 704, the slew rate value Vslew is calculated using the absolute value of the previous feedback signal sample Verr_previous and the current feedback signal sample Verr_present.

At 706, the slew rate value Vslew is compared to the fault reference Vfault_reference. If the slew rate value is greater than the fault reference, a fault condition is determined. If the slew rate value is less than the fault reference, no fault condition is detected and normal operation of the power supply may continue.

In another aspect, a method of detecting fault conditions in an isolated power supply is disclosed. The power supply includes a controller, a transformer having a primary winding and a secondary winding, at least one power switch coupled to the primary winding of the transformer, an output terminal coupled to the secondary winding, a feedback circuit coupled to the output terminal, a fault detection circuit coupled between the output terminal and the feedback circuit, and a single isolation device coupled between the feedback circuit and the controller.

The example method includes transmitting a feedback signal to the controller via the single isolation device. The feedback signal is defined by comparing a sensed output voltage at the output terminal to a voltage reference. The method also includes controlling switching operation of the power switch based on the feedback signal received at the controller, and modifying the feedback signal transmitted to the controller via the single isolation device when the sensed output voltage exceeds a fault reference. The method further includes detecting a fault condition when a slew rate of the feedback signal exceeds a fault threshold slew rate value.

Modifying the feedback signal may include increasing the value of the slew rate of the feedback signal by saturating the isolation device to a high saturation condition or a low saturation condition. The slew rate value may be a positive slew rate value, a negative slew rate value, an absolute slew rate value, etc. Detecting a fault condition may include periodically sampling the feedback signal, comparing a current feedback signal sample to a previous feedback signal sample, and determining that a fault condition has occurred when the difference between the current feedback signal sample and the previous feedback signal sample exceeds the fault threshold slew rate value. The fault threshold slew rate value may be greater than a slew rate of the feedback signal that occurs during a transient load condition of the output voltage.

This example method may be performed by any suitable controller in any suitable power supply, including, but not limited to, the example controllers and power supplies described herein.

Figure 8:
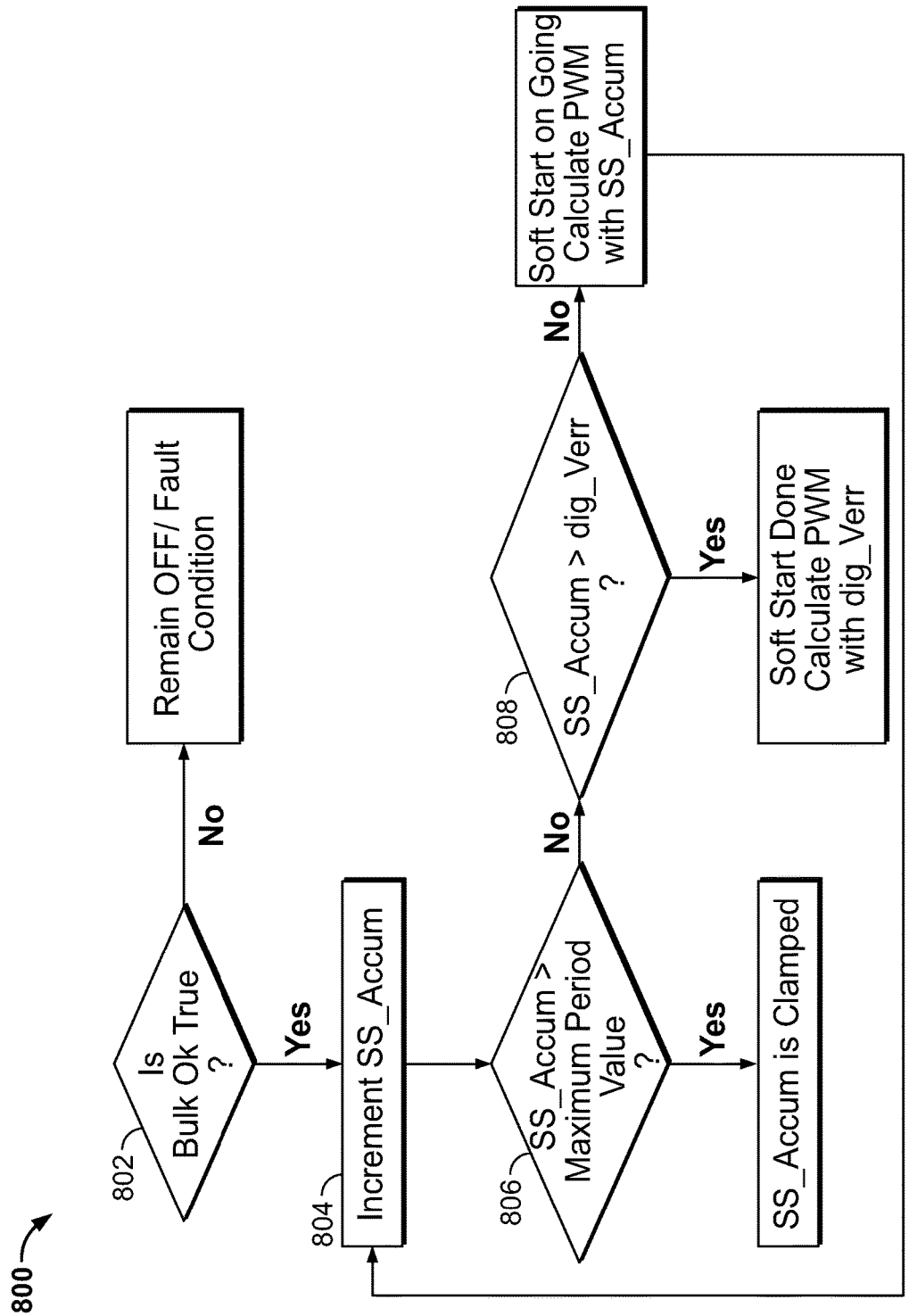
FIG. 8 is a flow chart of an example method of initiating a soft start of an isolated power supply.

According to another aspect of the present disclosure, an example method 800 of initiating a soft start of an isolated power supply is illustrated in FIG. 8. The example method 800 may not require any external trigger, external circuitry, etc. to initiate soft start of the power supply. In example power supply embodiments that include a PFC converter stage and a DC-DC converter stage, startup of the DC-DC converter stage may only require the presence of a stable bulk voltage between the PFC converter stage and the DC-DC converter stage (e.g., an input voltage to the DC-DC converter stage). Accordingly, at step 802, the method 800 includes determining whether a bulk voltage is present. If a voltage is not present, the power supply remains off. If the bulk voltage is present, a controller initiates soft start of the power supply.

Upon application of an input voltage, a voltage reference may be taken from an auxiliary converter bias output. Initially at startup, an output voltage of the power supply is approximately 0V. When the output voltage of 0V is compared to the voltage reference as illustrated in FIG. 3, for example, an output of error amplifier X1 will be forced high. This reverse biases diode D1 and the diode of the optocoupler of isolation device 218. The transistor side of the optocoupler enters the cutoff region and feedback signal Verr is high.

During normal operation of an LLC converter, the frequency of the power switch control would be set to a low value when Verr is high to increase the output voltage. However, this is not the case during soft start operation. During soft start, an accumulator variable is used in place of the feedback signal Verr to generate pulses. This effectively bypasses the control computation initially. The accumulator variable for the LLC converter is initially set to represent a high frequency (e.g., by having a low value corresponding to a low switching period).

The accumulator value is incremented each loop execution cycle, at 804. Incrementing the accumulator value causes the frequency of the converter switching to gradually reduce, thereby increasing the output voltage. As the frequency of the converter switching reduces, the output voltage approaches the voltage references, and the feedback signal Verr is reduced. Once the feedback signal Verr generates a switching frequency that is greater than the accumulator value switching frequency, control of the converter switching frequency passes to the Verr feedback signal. This is shown at 806 and 808 in FIG. 8.

At 806, the accumulator value is compared to a maximum period value. If the accumulator value is greater than the maximum period value, the accumulator value is clamped and no longer incremented. This indicates that the accumulator value has reached the lowest acceptable switching frequency for the converter.

If the accumulator value has not reached the maximum period value, the accumulator variable is compared to the feedback signal sampling error dig_Verr, at 808. If the accumulator value is greater than the feedback signal sampling error, soft start control is finished and control of the switching frequency is passed to the feedback signal (e.g., converter switching frequency will then be determined based on the feedback signal). If the accumulator value is less than the feedback signal sampling error, control of the converter switching frequency continues based on the accumulator value, and the process returns to 804 where the accumulator value is incremented.

Accordingly, the example soft start initiation process 800 allows for control of the converter switching frequency based on the accumulator value initially, then transitioning to control based on the feedback signal error value once the feedback signal error value is less than the accumulator value. Thus, the output voltage of the power supply can be raised more slowly initially based on the accumulator value, as opposed to the faster increase that would normally occur based on feedback signal error value control.

According to another aspect, a method of initiating soft start of an isolated power supply is disclosed. The power supply includes a controller, a transformer having a primary winding and a secondary winding, at least one power switch coupled to the primary winding of the transformer, an input terminal, an output terminal coupled to the secondary winding, a feedback circuit coupled to the output terminal, and at least one isolation device coupled between the feedback circuit and the controller to provide a feedback signal to the controller.

The example method includes initializing an accumulator value when an input voltage is detected at the input terminal of the power supply and periodically comparing the accumulator variable to an error value of the feedback signal. When the accumulator variable is less than the error value of the feedback signal, operation of the power switch is controlled based on the accumulator variable and incrementing the accumulator variable each operating cycle. When the error value of the feedback signal is less than the accumulator variable, operation of the power switch is controlled based on the error value of the feedback signal.

The method may include comparing the accumulator variable to a maximum period value, and when the accumulator variable exceeds the maximum period value, stopping the incrementing of the accumulator variable. The accumulator variable and the error value are each indicative of a switching period of the power switch. In some aspects, initiating the soft start of the power supply may not include receiving any soft start trigger signals from an external circuit.

This example method may be performed by any suitable controller in any suitable power supply, including, but not limited to, the example controllers and power supplies described herein. For example, a controller may be operable to initiate soft start of the power supply by using an accumulator variable instead of the feedback signal to operate the power switch at an initial high frequency during startup. The controller may then increment the accumulator variable each time a control loop cycle is executed to reduce the frequency of the power switch operation, and switch to controlling the power switch based on the feedback signal once an error value of the feedback signal indicates operation of the power switch at a frequency higher than the operation frequency indicated by the accumulator variable.

Figure 9:
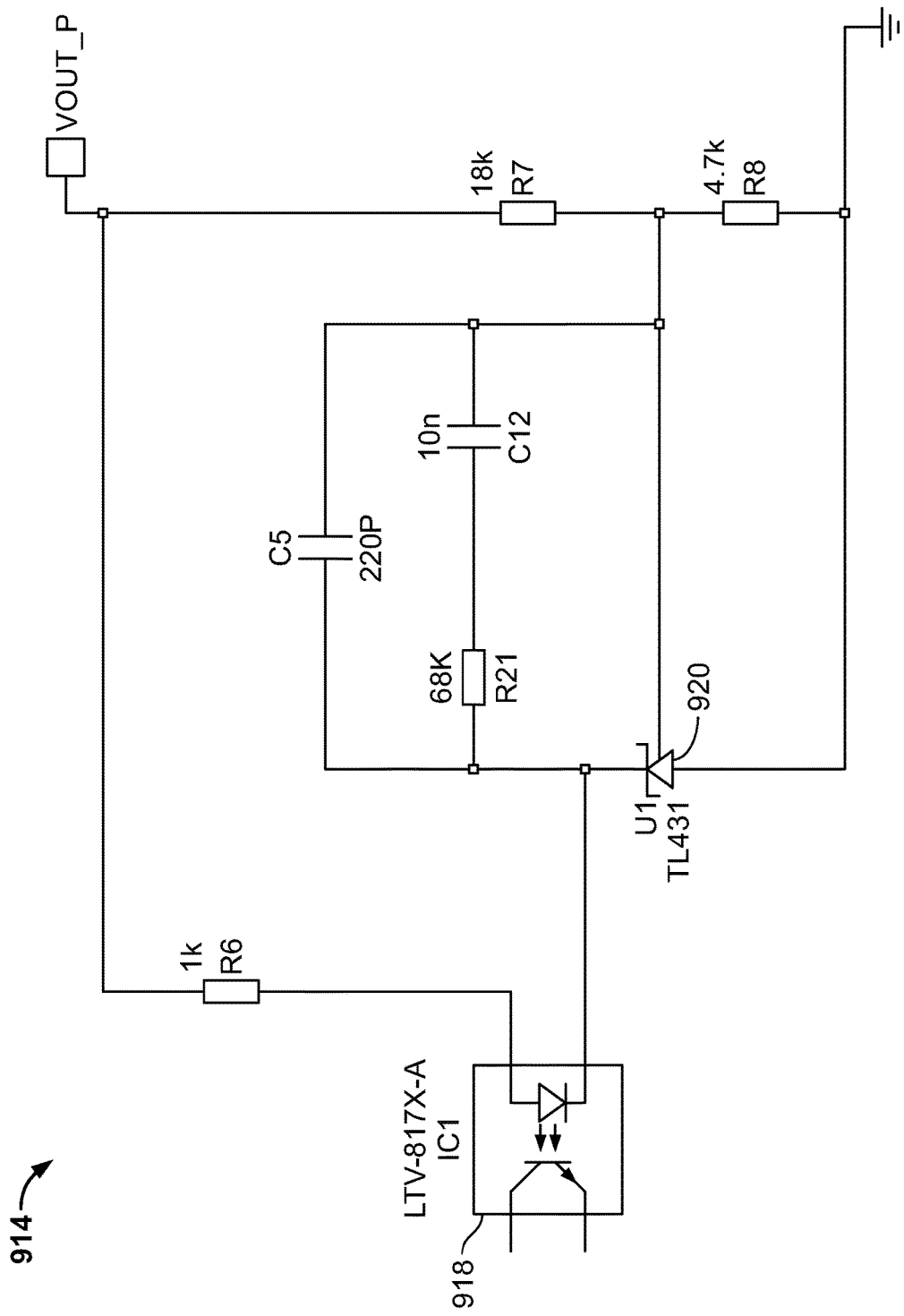
FIG. 9 is a circuit diagram of an example feedback circuit including a shunt regulator for initiating a soft start of an isolated power supply.

In some example embodiments, the error amplifier can be replaced by a shunt regulator (or other suitable component with similar function to a shunt regulator). FIG. 9 illustrates an example feedback circuit 914 having a shunt regulator 920 coupled to an isolation device 918.

Because the soft start routine does not require a signal from the secondary side, the soft start routine can start immediately once an input voltage is detected. Initiation of the soft start routine will cause an increase in the output voltage Vout_p, which will eventually activate the shunt regulator 920 and initiate closed loop control via isolation device 918.

Any of the example embodiments and aspects disclosed herein may be used in any suitable combination with any other example embodiments and aspects disclosed herein without departing from the scope of the present disclosure. For example, power supplies described herein may implement other control methods, the control methods described herein may be implemented in other power supplies, etc. without departing from the scope of the present disclosure.

Example embodiments and aspects of the present disclosure may provide any of the following advantages: turn off, reset, fault detection, latch protection, etc. may be provided using a single isolation device, reduced need for additional fault isolation devices, reduced component count, reduced circuit complexity, reduced cost, use of a single DSP to control both a PFC converter stage and a DC-DC converter stage, soft start capability without additional external soft start initiation circuitry, etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:
1. An isolated power supply comprising:
   a transformer having a primary winding and a secondary winding;
   at least one power switch coupled to the primary winding of the transformer;
   a controller coupled to the power switch to control operation of the power switch;

an output terminal coupled to the secondary winding to provide an output voltage to a load;

a feedback circuit coupled to the output terminal and adapted to sense the output voltage and compare the sensed output voltage to a voltage reference to define a feedback signal;

a fault detection circuit coupled between the output terminal and the feedback circuit and adapted to sense the output voltage, compare the sensed output voltage to a fault reference, and modify the feedback signal when the sensed output voltage exceeds the fault reference; and a single isolation device coupled between the feedback circuit and the controller and adapted to provide the feedback signal to the controller, the controller operable to control the power switch based on the feedback signal and to detect a fault condition when a slew rate of the feedback signal exceeds a fault threshold slew rate value.

2. The isolated power supply of claim 1, wherein the fault detection circuit includes a fault switch coupled to the single isolation device, and a comparator that turns on the fault switch to saturate the isolation device when the sensed output voltage exceeds the fault reference, thereby increasing the slew rate of the feedback signal beyond the fault threshold slew rate.

3. The isolated power supply of claim 1, wherein the fault threshold slew rate value is greater than a slew rate of the feedback signal that occurs during a transient load condition of the output voltage.

4. The isolated power supply of claim 1, wherein the controller is operable to periodically sample the feedback signal, compare a current feedback signal sample to a previous feedback signal sample, and detect a fault condition when the value of a difference between the current feedback signal sample and the previous feedback signal sample exceeds the fault threshold slew rate value.

5. The isolated power supply of claim 1, wherein the power supply comprises an AC to DC power supply having an input for receiving an input AC voltage, and a power factor correction (PFC) circuit coupled between the input and the primary winding of the transformer.

6. The isolated power supply of claim 5, wherein the controller is a single digital signal processor operable to control both the PFC circuit and the at least one power switch coupled to the primary winding of the transformer.

7. The isolated power supply of claim 1, wherein the controller is operable to shut down operation of the power supply when a fault condition is detected.

8. The isolated power supply of claim 1, wherein the single isolation device comprises an optocoupler.

9. The isolated power supply of claim 1, wherein the controller is operable to initiate soft start of the power supply by using an accumulator variable instead of the feedback signal to operate the power switch at an initial high frequency during startup, increment the accumulator variable each time a control loop cycle is executed to reduce the frequency of the power switch operation, and switch to controlling the power switch based on the feedback signal once an error value of the feedback signal indicates operation of the power switch at a frequency higher than a frequency of operation indicated by the accumulator variable.

10. The isolated power supply of claim 9, wherein the power supply does not include an external circuit to initiate soft start of the power supply.

11. The isolated power supply of claim 9, wherein the feedback circuit includes a shunt regulator.

12. A method of detecting fault conditions in an isolated power supply including a controller, a transformer having a primary winding and a secondary winding, at least one power switch coupled to the primary winding of the transformer, an output terminal coupled to the secondary winding, a feedback circuit coupled to the output terminal, a fault detection circuit coupled between the output terminal and the feedback circuit, and a single isolation device coupled between the feedback circuit and the controller, the method comprising:

transmitting a feedback signal to the controller via the single isolation device, the feedback signal defined by comparing a sensed output voltage at the output terminal to a voltage reference;

controlling switching operation of the power switch based on the feedback signal received at the controller;

modifying the feedback signal transmitted to the controller via the single isolation device when the sensed output voltage exceeds a fault reference; and detecting a fault condition when a slew rate of the feedback signal exceeds a fault threshold slew rate value.

13. The method of claim 12, wherein modifying the feedback signal includes increasing the slew rate of the feedback signal by saturating the single isolation device to a high saturation condition or a low saturation condition, wherein the slew rate value may be a positive slew rate value, a negative slew rate value, or an absolute slew rate value.

14. The method claim 12, wherein detecting a fault condition includes:

periodically sampling the feedback signal;

comparing a current feedback signal sample to a previous feedback signal sample; and determining that a fault condition has occurred when the difference between the current feedback signal sample and the previous feedback signal sample exceeds the fault threshold slew rate value.

15. The method of claim 12, wherein the fault threshold slew rate value is greater than a slew rate of the feedback signal that occurs during a transient load condition of the output voltage.

16. A method of initiating a soft start of an isolated power supply including a controller, a transformer having a primary winding and a secondary winding, at least one power switch coupled to the primary winding of the transformer, an input terminal, an output terminal coupled to the secondary winding, a feedback circuit coupled to the output terminal, and at least one isolation device coupled between the feedback circuit and the controller to provide a feedback signal to the controller, the method comprising:

initializing an accumulator value when an input voltage is detected at the input terminal of the power supply;

periodically comparing the accumulator value to an error value of the feedback signal;

when the accumulator value is less than the error value of the feedback signal, controlling operation of the power switch based on the accumulator value and incrementing the accumulator value each operating cycle; and when the error value of the feedback signal is less than the accumulator value, controlling operation of the power switch based on the error value of the feedback signal.

17. The method of claim 16, wherein the accumulator value and the error value are each indicative of a switching period of the power switch.

18. The method of claim 16, further comprising:
comparing the accumulator value to a maximum period value; and
when the accumulator value exceeds the maximum period value, stopping the incrementing of the accumulator value.

19. The method of claim 16, wherein the method of initiating the soft start of the power supply does not include receiving any soft start trigger signals from an external circuit.

20. The method of claim 16, wherein the feedback circuit includes a shunt regulator.

* * * * *